United States Patent Office 3,326,939
Patented June 20, 1967

3,326,939
AEH PHOSPHITES
Alvin Guttag, Bethesda, Md., assignor to Weston Chemical Corporation, Morgantown, W. Va., a corporation of New Jersey
No Drawing. Filed Apr. 21, 1966, Ser. No. 546,130
8 Claims. (Cl. 260—345.9)

This application is a continuation-in-part of application Ser. No. 256,116, filed Feb. 4, 1963, now abandoned.

The present invention relates to novel phosphites and phosphonates.

It is an object of the present invention to prepare alcoholic hydroxyl containing phosphites which have good temperature stability.

Another object is to prepare phosphites having one or more free hydroxyl groups which can be used to form flame-resistant polyurethanes and polyesters.

A further object is to prepare novel phosphite stabilizers for vinyl chloride resins, polypropylene and other polymers.

A further object is to form novel phosphonates useful for forming flame-resistant polymers, e.g., polyurethanes.

A still further object is to prepare novel lubricating oil additives.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by forming compounds having one of the following formulae:

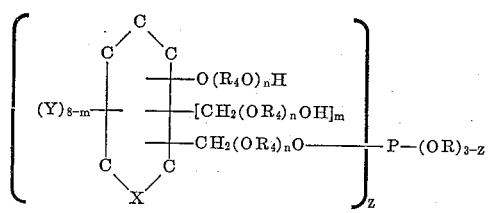

I

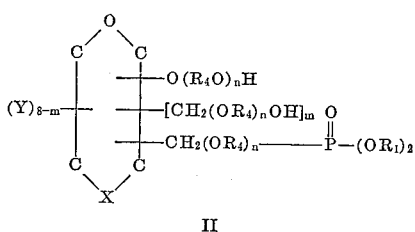

II

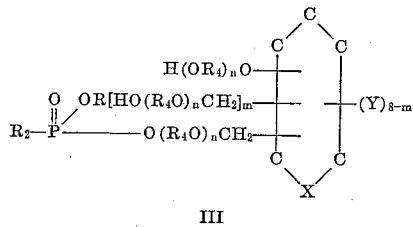

III

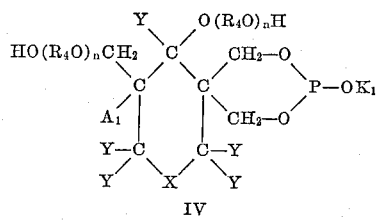

IV

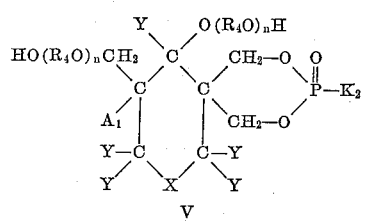

V

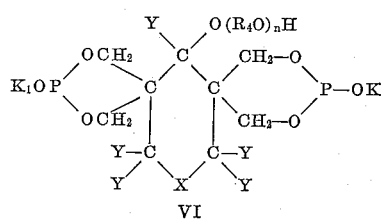

VI

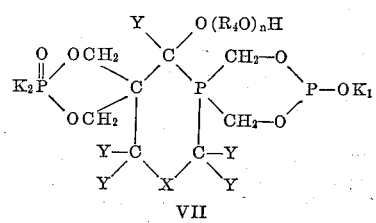

VII

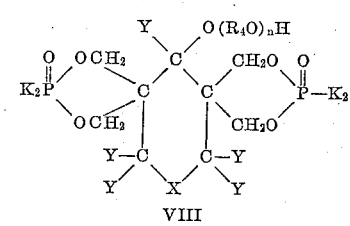

VIII

In the above formulae R is selected from the group consisting of alkyl, aryl (e.g., phenyl or alkylphenyl), aralkyl (e.g., benzyl) or halophenyl; $R_4$ is a lower alkylene radical, e.g., ethylene radical, propylene radial or butylene radical or mixtures of such radicals; $R_1$ is selected from the group consisting of alkyl, aryl (e.g., phenyl or alkylphenyl), aralkyl (e.g., benzyl), halophenyl, or $R_3$ where $R_3$ is

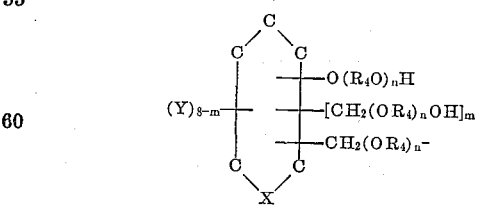

$R_2$ is alkyl, aralkyl, hydroxyalkyl, hydroxyalkoxyalkyl, hydroxypolyalkoxyalkyl or $R_3$; Y is hydrogen or lower alkyl containing 1 to 6 carbon atoms; $A_1$ is hydrogen, lower alkyl of 1 to 6 carbon atoms or $HO(R_4O)_nCH_2$—, $K_1$ is alkyl, aryl (e.g., phenyl or alkylphenyl), aralkyl (e.g., benzyl) or $H(OR_4)_f$—; $K_2$ is alkyl, aralkyl or $H(OR_4)_f$—; X is oxygen or —$CH_2$—, preferably X is oxygen; Z is an integer from 1 to 3 inclusive; m is an integer from 1 to 3 inclusive; $n$ is selected from the group consisting of zero and an integer of 1 or more, e.g., 1 to 100; $f$ is an integer of at least 1, e.g., 1 to 100.

The compounds of the present invention are all useful for imparting flame resistance to polymers such as polyurethanes (e.g., a polyurethane from toluene diisocyanate and polypropylene glycol 2025) or polyesters (e.g., polyethylene terephthalate or styrene modified ethylene glycol maleate phthalate) or to impart flame resistance to cellulose and cellulose esters, e.g., cellulose acetate, or cellulose ethers. The phosphites of the present invention are useful as antioxidants and stazilizers for polypropylene, polyvinyl chloride and other vinyl halide resins as well as being stabilizers for polyurethanes and epoxy resins.

Both the phosphonates and the phosphites of the present invention contain a reactive hydroxyl group which is useful in making polyurethanes and polyesters. If only one hydroxyl group is present the phosphite or phosphonate serves as a chain stopper. If a plurality of hydroxyl groups are present the phosphite or phosphonate of the present invention can serve as the sole polyhydroxyl compound for reaction with a polyisocyanate, e.g., toluene diisocyanate and PAPI (polymerized phenylmethyleneisocyanate) to form a flame-resistant polyurethane or there can also be incorporated 1 to 98% of another polyol, e.g., polypropylene glycol 2025 or glycerine-propylene oxide adduct molecular weight 3000.

The phosphites of the present invention are prepared by reacting a phosphite having the formula $(R_5O)_3P$ with a substituted pyranol or substituted cyclohexanol. The reaction is normally carried out in the presence of 0.1–10% of a catalyst based on the weight of the $(R_5O)_3P$ compound. As catalysts there can be used diaryl phosphites or dialkyl phosphites, e.g., diphenyl phosphite, di-p-cresyl phosphite, diethyl phosphite and didecyl phosphite, or there can be used alkaline catalysts, e.g., alcoholates and phenolates such as sodium methylate, sodium decylate, sodium phenolate or potassuim cresylate. Such materials are known as phosphite ester interchange catalysts.

In the formula $(R_5O)_3P$ the radical $R_5$ is alkyl, aryl, haloaryl or aralkyl. Examples of starting phosphites having the formula $(R_5O)_3P$ are triphenyl phosphite, tri p-cresyl phosphite, tribenzyl phosphite, phenyl didecyl phosphite, tris decyl phosphite, tri o-chlorophenyl phosphite, trimethyl phosphite and trioctadecyl phosphite.

The substituted tetrahydropyranols and substituted cyclohexanols employed as starting materials for the most part are old compounds. Those which are new are analogous to the old ones and can be prepared in like manner. Typical examples of suitable starting substituted tetrahydropyranols and substituted cyclohexanols are found in Barnes Patent 3,022,256 and Wittcoff Patent 2,462,031. To prepare the oxyalkylated compounds of the present invention there can be employed conventional oxyalkylation techniques such as shown in Barnes Patent 3,022,256 or De Groote Patent 2,499,365.

The preferred starting material is anhydroenneaheptitol available under the trade name AEH and which is also called 3,3,5,5-tetrakis(hydroxymethyl)-4 - hydroxy - tetrahydropyran.

Other examples of substituted tetrahydropyranols and substituted cylohexanols which can be employed as starting material are 3,3,5,-tris(hydroxymethyl)-5-methyl-4-hydroxy tetrahydropyran; 3,5-bis(hydroxymethyl)-3,5-dimethyl - 4 - hydroxytetrahydropyran; 2,2,6,6 - tetrakis(hydroxymethyl)cyclohexanol; 3,3,5-tris(hydroxymethyl)-5-n-hexyl-4-hydroxy-tetrahydropyran; adduct of 10 mols of propylene oxide with 1 mol of 3,3,5,5-tetrakis(hydroxymethyl) - 4 - hydroxy-tetrahydropyran (hydroxyl number about 357); adduct of 8 mols of propylene oxide with 1 mol of 3,3,5-tris(hydroxymethyl)-5-methyl - 4 - hydroxy-tetrahydropyran (hydroxyl number about 347); adduct of 14.5 mols of propylene oxide with 1 mol of 3,5-(hydroxymethyl)-3,5-dimethyl-4 - hydroxy - tetrahydropyran (hydroxyl number about 168); adduct of 5 mols of propylene oxide with 1 mol of 3,3,5,5-tetrakis(hydroxymethyl)-4-hydroxy-tetrahydropyran; adduct of 4 mols of propylene oxide with 1 mol of AEH; adduct of 10 mols of ethylene oxide with 1 mol of AEH; adduct of 10 mols of butylene oxide with 1 mol of AEH. Adduct of 20 mols of ethylene oxide with 1 mol of 3,3,5-tris(hydroxymethyl)-5-methyl-4-hydroxy-tetrahydropyran.

The phosphites within Formula I are prepared by reacting at least two mols of a substituted tetrahydropyranol or substituted cyclohexanol of the type indicated with 1 mol of a phosphite having the formula $(R_5O)_3P$. When Z in Formula I is 2 then 2 mols of the substituted tetrahydropyranol or cyclohexanol are employed. When Z is 3 then at least 3 mols of the substituted tetrahydropyranol or cyclohexanol are employed. Preferably excess substituted tetrahydropyranol or cyclohexanol are used, e.g., 4, 5, 10 or 15 mols per mol of starting phosphite to cut down on possible side reactions. The excess substituted tetrahydropyranol or cyclohexanol when such excess is employed can be removed if desired from the phosphite product by the use of solvents. For many uses, however, there is no need to remove the excess. Thus, if the phosphite product is to be used to make foamed polyurethanes the excess substituted tetrahydropyranol or cyclohexanol can be left in the product since the substituted tetrahydropyranol or cyclohexanol as well as the phosphite product of Formula I will react with the polyisocyanate, e.g., toluene diisocyanate and foaming agent, e.g., water, to give a solid foamed polyurethane. The presence of the phosphite of Formula I insures that the polyurethane will have good flame and fire resistance. Similarly, if the phosphite of Formula I is to be used to form a polyester any excess substituted tetrahydropyranol or cyclohexanol can be left in the phosphite of Formula I.

The compounds of Formula I wherein Z is 1 and $m$ is 1 and the $—CH_2(OR_4)_nOH$ group is attached to a different carbon atom then the $—CH_2(OR_4)_nO—$ group can be formed by reacting 1 mol of the substituted tetrahydropyranol or cyclohexanol with 1 mol of the phosphite $(R_5O)_3P$.

The compounds within Formula IV can be prepared by reacting 1 mol of a substituted tetrahydropyranol or cyclohexanol having at least one carbon atom having attached thereto two hydroxymethyl groups with I mol of a phosphite having the formula $(R_5O)_3P$. In the event that $K_1$ is $H(OR_4)_f—$ then the initial product must be further reacted with 1 mol of the appropriate dihydric alcohol, e.g., ethylene glycol, propylene glycol, diethylene glycol or dipropylene glycol utilizing an alkaline catalyst or dihydrocarbon phosphite catalyst as indicated above and distilling, preferably under vacuum to remove the phenol or monohydric alcohol formed.

The compounds within Formula VI are formed by reacting 1 mol of a substituted tetrahydropyranol or cyclohexanol having two carbon atoms to each of which are attached two hydroxymethyl groups with 2 mols of a phosphite having the formula $(R_5O)_3P$. In the event that at least one K is $H(OR_4)_f—$ then the initial product is reacted with 1 or more mols, e.g., 2 mols of the appropriate dihydric alcohol, e.g., ethylene glycol, propylene glycol or dipropylene glycol in the manner set forth previously.

The phosphonates of the present invention are prepared by Arbuzov rearrangement of the phosphites utilizing alkyl halides, alkenyl halide or aralkyl halides or hydroxyalkyl halides having the formula $R_6X$ where $R_6$ is alkyl, aralkyl or hydroxyalkyl and X is a halogen or using alkali metal or alkaline earth metal halides, e.g., sodium iodide, sodium bromide, lithium iodide, calcium iodide, potassium iodide.

Thus the phosphites of the present invention can be isomerized to the corresponding phosphonates by heating, e.g., at a temperature of 130–225° C. with a catalytic amount, e.g., 1–10 mol percent of sodium iodide, sodium bromide, potassium iodide, butyl bromide, amyl bromide, amyl chloride, amyl iodide, ethylene bromohydrin, propylene iodohydrin, allyl bromide, decyl iodide, octadecyl iodide, benzyl bromide, benzyl iodide, methyl iodide.

If at least 1 mol of the compound $R_6X$ is employed per mol of the phosphite then the $R_6$ group is attached directly to the phosphorus atom of the product rather than the R or $K_1$ group of the starting phosphite of Formulae I, IV, VI.

The phosphonates of Formulas II and III are formed by Arbuzov rearrangement of the corresponding phosphites of Formula I. The phosphonates of Formula V are formed by Arbuzov rearrangement of the appropriate phosphites of Formula IV. The compounds of Formulae VII are formed initially in the Arbuzov rearrangement of the corresponding phosphites of Formulae VI. If the Arbuzov rearrangement is continued by further heating then the compounds of Formulae VIII are formed.

Illustrative compounds within the present invention are tris[3,3,5,5 - tetrakis(hydroxymethyl)-4-hydroxy-tetrahydropyran] phosphite also called tris AEH phosphite and having the formula

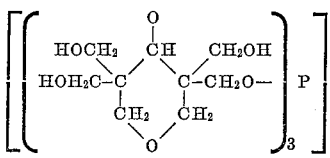

tris[3,3,5-tris(hydroxymethyl)-5-methyl-4-hydroxy-tetrahydropyran]phosphite;
tris[3,5-bis(hydroxymethyl)-3,5-dimethyl-4-hydroxy-tetrahydropyran]phosphite;
tris[2,2,6,6-tetrakis(hydroxymethyl)cyclohexanol]phosphite;
bis AEH phenyl phosphite;
bis AEH methyl phosphite;
bis AEH decyl phosphite;
bis AEH allyl phosphite;
bis AEH hydroxypropyl phosphite,
bis AEH octadecyl phosphite;
bis AEH p-cresyl phosphite;
bis AEH benzyl phosphite;
3,5-bis(hydroxymethyl)-3,5-dimethyl-4-hydroxy tetrahydropyran diphenyl phosphite;
3,5-bis(hydroxymethyl)-3,5-dimethyl-4-hydroxy-tetrahydropyran dipropyl phosphite;
bis[2,2,6,6-tetrakis(hydroxymethyl)cyclohexanol] decyl phosphite;
tris AEH phosphonate

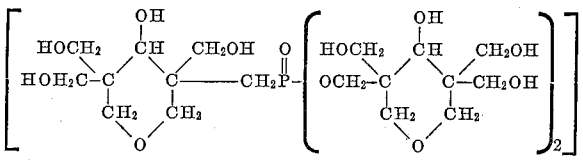

bis AEH methane phosphonate;
bis AEH decane phosphonate,
bis AEH octadecane phosphonate;
bis AEH propene phosphonate;
bis AEH phenylmethanephosphonate;
bis AEH 2-hydroxypropanephosphonate;
bis AEH 2-hydroxybutanephosphonate;
bis AEH hydroxyethanephosphonate;
phenyl bis AEH phosphonate;
diphenyl 3,5-bis (hydroxymethyl)-3,5-dimethyl-4-hydroxy-tetrahydropyranphosphonate;
tris(AEH-10 mols propylene oxide adduct)phosphite;
tris(AEH-5 mols ethylene oxide adduct)phosphite;
tris(AEH-15 mols butylene oxide adduct)phosphite;
tris(AEH-10 mols propylene oxide adduct)phosphonate;
tris(AEH-5 mols ethylene oxide adduct)phosphonate;
tris(AEH-5 mols ethylene oxide adduct)phosphonate;
bis(AEH-15 mols propylene oxide adduct)butanephosphonate;
tris[2,2,6,6-tetrakis(hydroxymethyl)cyclohexanol] phosphonate;

2-phenoxy-1,3,8-trioxa-2-phospha-10,10-bis(hydroxymethyl)-11-hydroxy(5,5)spiroundecane;
2-methoxy-1,3,8-trioxa-2-phospha-10,10-bis(hydroxymethyl)-11-hydroxy(5,5)spiroundecane

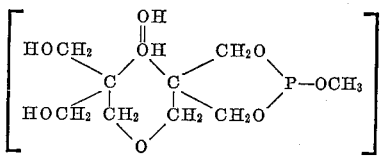

2-methane phosphono 1,3,8-trioxa-10,10-bis(hydroxymethyl)-11-hydroxy(5,5)spiroundecane

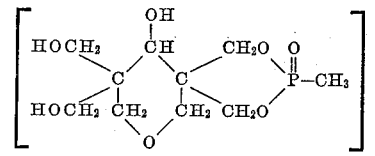

2-decoxy-1,3,8-trioxa-2-phospha-10,10-bis(hydroxymethyl)-11-hydroxy(5,5)spiroundecane;
2-decane-phosphono-1,3,8-trioxa-10,10-bis(hydroxymethyl)-11-hydroxy(5,5)spiroundecane;
2-octadecoxy-1,3,8-trioxa-2-phospha-10,10-bis(hydroxymethyl)-11-hydroxy(5,5)spiroundecane;
2-octadecane phosphono-1,3,8-trioxa-10,10-bis(hydroxymethyl)-11-hydroxy(5,5)spiroundecane;
2-decoxy-1,3,8-trioxa-2-phospha-10,10-bis(hydroxymethyl)-11-hydroxypropoxy(5,5)spiroundecane;
2-hydroxypropoxy-1,3,8-trioxa-2-phospha-10,10-bis(hydroxymethyl)-11-hydroxy(5,5)spiroundecane;
2($2^1$-hydroxy)propane-phosphono-1,3,8-trioxa-10,10-bis(hydroxymethyl)-11-hydroxy(5,5)spiroundecane;
2-phenylmethane phosphono-1,3,8-trioxa-10,10-bis(hydroxymethyl)-11-hydroxy(5,5)spiroundecane;
2-propenephosphono-1,3,8-trioxa-10,10-bis(hydroxymethyl)-11-hydroxy(5,5)spiroundecane;
2-phenoxy-1,3,8-trioxa-2-phospha-10-methyl-10-hydroxymethyl-11-hydroxy(5,5)spiroundecane;
2-decanephosphono-1,3,8-trioxa-10-methyl-10-hydroxymethyl-11-hydroxy(5,5)spiroundecane;
2-phenoxy-1,3-dioxa-2-phospha-10,10-bis(hydroxymethyl)-11-hydroxy(5,5)spiroundecane [which can also be called
2-phenoxy-1,3-dioxa-2-phospha-7-hydroxy-8,8-bis(hydroxymethyl) (5,5)spiroundecane];
2-hydroxyethanephosphono-1,3-dioxa-10,10-bis(hydroxymethyl)-11-hydroxy(5,5)spiroundecane;
2,14-diphenoxy-1,3,8,13,15-pentaoxa-2,14-diphospha-11-hydroxy[5,5,10,10]dispiro hexadecane

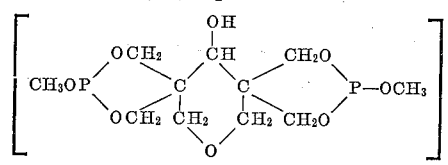

2,14-di(methanephosphono)-1,3,8,13,15-pentaoxa-11-hydroxy[5,5,10,10]dispiro hexadecane

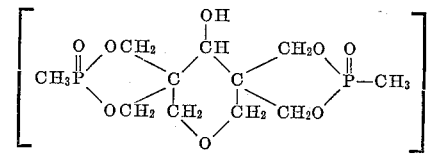

2,14-dioctadecoxy-1,3,8,13,15-pentaoxa-2,14-diphospha-11-hydroxy[5,5,10,10] dispiro hexadecane;
2,14-di(octadecanephosphono)-1,3,8,13,15-pentaoxa-11-hydroxy[5,5,10,10]dispiro hexadecane;
2,14-dioleyloxy-1,3,8,13,15-pentaoxa-2,14-diphospha-11-hydroxy[5,5,10,10]dispiro hexadecane;
2,14-(di-$\Delta^{9'}$-octadecene-phosphono)-1,3,8,13,15-pentaoxa-11-hydroxy[5,5,10,10]dispiro hexadecane;

2,14-di(2'-hydroxypropoxy)-1,3,8,13,15-pentaoxa-2,14-diphospha-11-hydroxy[5,5,10,10]dispiro hexadecane;

2,14-di(2'-hydroxypropanephosphono)1,3,8,13,15-pentaoxa-11-hydroxy[5,5,10,10]dispiro hexadecane;

2,14-didecoxy-1,3,13,15-tetraoxa-2,14-diphospha-11-hydroxy[5,5,10,10]dispiro hexadecane;

2,14-di(decanephosphono)-1,3,13,15-tetraoxa-11-hydroxy[5,5,10,10]dispiro hexadecane;

2-butanephosphono-14-butoxy-1,3,8,13,15-pentaoxa-14-phospha-11-hydroxy[5,5,10,10]dispiro hexadecane;

2,14-dibenzyloxy-1,3,8,13,15-pentaoxa-2,14-diphospha-11-hydroxy[5,5,10,10]dispiro hexadecane;

2,4-di(phenylmethanephosphono)-1,3,8,13,15-pentaoxaoxa-11-hydroxy[5,5,10,10]dispiro hexadecane;

the phosphite made from 1 mol of the AEH–5 mols of propylene oxide adduct and 1 mol of trimethyl phosphite and also the phosphonate made by isomerizing the phosphite; the phosphite made from 1 mol of the AEH–15 mols of ethylene oxide adduct and 1 mol of tris benzyl phosphite and also the phosphonate made by isomerizing the phosphite.

Unless otherwise indicated, all parts and percentages are by weight.

3,3,5,5 - tetrakis(hydroxymethyl) - 4 - hydroxytetrahydropyran is commercially available under the trade name AEH in the form of a 70% aqueous solution. Before reacting the AEH with a tris hydrocarbon phosphite preferably substantially all of the water is removed by distillation to leave the AEH as a viscous syrup. Alternatively the water can be azeotroped off with 1,4-dioxane as a solvent and the AEH can be left in the dioxane solution.

*Example 1*

3 mols of AEH as a substantially anhydrous syrup, 1 mol of triphenyl phosphite and 3 grams of diphenyl phosphite were heated in a vacuum of about 15 mm. and the phenol formed removed by distillation. The viscous residue in the pot was tris AEH phosphite.

*Example 2*

1 mol of tris AEH phosphite was heated at 200° C. with 5 mol percent of n-amyl iodide for 7 hours to form tris AEH phosphonate by the Arbuzov rearrangement.

*Example 3*

5 mols of AEH syrup were heated with 1 mol of tris decyl phosphite and 2 grams of bis decyl phosphite in a vacuum of about 15 mm. and the decyl alcohol formed removed by distillation. The residue in the pot was a mixture of tris AEH phosphite and AEH. This mixture was suitable as such for reaction with toluene disocyanate and water to give a foamed polyurethane.

*Example 4*

The mixture of tris AEH phosphite and AEH formed in Example 3 was heated with 4 mol percent of butyl bromide based on the tris AEH phosphite. After heating for 8 hours at 200° C. there was formed tris AEH phosphonate admixed with free AEH. This product was suitable for use as such with toluene disocyanate to form a polyurethane.

*Example 5*

2 mols of AEH were heated with 1 mol of trimethyl phosphite and 2 grams of bis decyl phosphite. The methyl alcohol formed was removed by distillation to form bis AEH methyl phosphite as the residue.

*Example 6*

Bis AEH methyl phosphite was heated at 200° C. with 3 mol percent of butyl iodide for 7 hours to form bis AEH methanephosphonate.

*Example 7*

1 mol of bis AEH methyl phosphite was heated at 200° C. with an equimolar amount of propylene bromohydrin for 8 hours to bis AEH 2-hydroxypropanephosphonate.

*Example 8*

6 mols of AEH-propylene oxide adduct (having 10 mols of propylene oxide per mol of AEH) was heated with 1 mol of triphenyl phosphite and 3 grams of diphenyl phosphite while removing the phenol formed in a vacuum. The product was tris AEH-propylene oxide adduct phosphite admixed with the excess AEH-propylene oxide adduct.

The product of Example 8 was rearranged to the corresponding tris AEH-propylene oxide adduct phosphonate by heating to 200° C. with 4 mol percent of amyl iodide based on the tris AEH-propylene oxide adduct phosphite.

*Example 9*

4 mols of 3,3,5-tris (hydroxymethyl)-5-methyl-4-hydroxy tetrahydropyran in syrup form were heated with 1 mol of triphenyl phosphite and 3 grams of diphenyl phosphite and the phenol formed removed in the manner set forth in Example 1. The residue was tris[3,3,5-tris (hydroxymethyl)-5-methyl-4-hydroxy tetrahydropyran]phosphite.

The corresponding phosphonate is formed by heating the product of Example 9 with 5 mol percent of amyl bromide based on the phosphite.

*Example 10*

3 mols of 3,5-bis(hydroxymethyl)-3,5-dimethyl-4-hydroxy tetrahydropyran were heated with 1 mol of triphenyl phosphite and 3 grams of diphenyl phospite using the procedure of Example 1 to produce tris[3,5-bis(hydroxymethyl) - 3,5-dimethyl-4-hydroxy tetrahydropyran] phosphite.

The corresponding phosphonate is formed by heating the product of Example 10 with 6 mol percent of butyl bromide.

*Example 11*

1 mol of AEH syrup was heated with 1 mol of triphenyl phosphite in the presence of 3 grams of diphenyl phosphite. The phenol formed was removed in a vacuum at 15 mm. The product was 2 - phenoxy - 1,3,8-trioxa-2-phospha - 10,10 - bis(hydroxymethyl)-11 - hydroxy(5,5) spiro undecane.

*Example 12*

1 mol of the product of Example 11 was heated with 1 mol of dipropylene glycol and 3 grams of diphenyl phosphite. The phenol formed was removed in vacuum. The product was 2 - hydroxypropoxy - propoxy-1,3,8-trioxa-2-phospha-10,10-bis(hydroxymethyl)-11-hydroxy(5,5) spiro undecane.

The product of Example 12 when heated with 5 mol percent of amyl iodide produced 2-hydroxypropoxy-propanephosphono - 1,3,8 - trioxa - 10,10 - bis(hydroxymethyl)-11-hydroxy(5,5)spiro undecane.

*Example 13*

1 mol of AEH syrup was heated with 1 mol of tris decyl phosphite in the presence of 3 grams of bis decyl phosphite. The decyl alcohol was removed in vacuum. The product was 2-decoxy-1,3,8-trioxa-2-phospha-10,10-bis(hydroxymethyl)-11-hydroxy(5,5)spiro undecane.

*Example 14*

1 mol of the product of Example 13 was heated to 200° C. with 5 mol percent of decyl iodide to produce 2 - decanephosphono-1,3,8-trioxa-10,10-bis(hydroxymethyl)-11-hydroxy(5,5)spiro undecane.

*Example 15*

1 mol of 3,3,5,5-tetrakis-(hydroxymethyl)-4-pyranol was heated with 1 mol of triallyl phosphite and 3 grams of diallylphosphite to produce 2-allyloxy-1,3-dioxa-2-phospha-10,10-bis(hydroxymethyl)-11-hydroxy(5,5) spiro undecane. By heating with 5% of allyl iodide this product was rearranged to 2-propenephosphono-1,3-dioxa-10,10-bis(hydroxymethyl)-11-hydroxy(5,5)spiro undecane.

*Example 16*

1 mol of AEH syrup was heated with 2 mols of triphenyl phosphite in the presence of 3 grams of diphenyl phosphite. The phenol formed was removed in a vacuum at 15 mm. to produce 2,14-diphenoxy-1,3,8,13,15-pentaoxa - 2,14 - diphospha - 11 - hydroxy[5,5,10,10]dispiro hexadecane.

*Example 17*

1 mol of AEH syrup was heated with 2 mols of tris octyl phosphite in the presence of 3 grams of dioctyl phosphite. The octyl alcohol formed was removed by vacuum distillation. The product was 2,14-dioctoxy-1,3,8,13,15-pentaoxa - 2,14 - diphospha-11-hydroxy[5,5,10,10]dispiro hexadecane.

*Example 18*

1 mol of the product of Example 17 was heated at 200° C. with 5 mol percent of octyl iodide. At first there was formed some 2-octanephosphono-14-butoxy-1,3,8,13,15-pentaoxa - 14 - phospha - 11 - hydroxy[5,5,10,10] dispiro hexadecane. Upon further heating at 200° C. this was converted to 2,14-di(octanephosphono)-1,3,8,13,15-pentaoxa-11-hydroxy[5,5,10,10]dispiro hexadecane.

*Example 19*

1 mol of the product of Example 16 was heated with 2 mols of propylene glycol in the presence of 3 grams of diphenyl phosphite and the phenol formed removed by distillation in a vacuum. The product was 2,14-bis(2'-hydroxypropoxy) - 1,3,8,13,15 - pentaoxa - 2,14-disphospha-11-hydroxy[5,5,10,10]dispiro hexadecane. By prolonged heating at 210° C. with 3 mol percent of propylene iodohydrin this product was converted to the corresponding diphosphonate.

*Example 20*

1 mol of AEH-ethylene oxide adduct (having 5 ethylene oxide units per mol of AEH) was heated with 2 mols of tris decyl phosphite and 3 grams of bis decyl phosphite to produce the dispiro diphosphite. By heating one mol of the dispiro phosphite with 5 mol percent of decyl bromide the corresponding dispiro diphosphonate was produced.

In each of Examples 1 to 20 the product was a viscous liquid.

Ring formation occurred in Example 16 in the manner indicated rather than on the CHOH grouping because the methylol hydrogens were more reactive than the hydrogen of the hydroxyl attached to the ring. This was also true in some of the other examples, as indicated.

The type of product obtained, as pointed out earlier in the specification, is dependent upon the mol ratio of the starting phosphite to the substituted pyranol or substituted cyclohexanol. While small amounts of impurities are present in the product, there is no need to separate them since the products are useful in the manner indicated even with the impurities present.

*Example 21*

Enneatol 535 which is a water solution of AEH containing 80% of AEH, was employed in this example.

1840 parts of Enneatol 535 were charged into a 5000 ml. three-neck flask fitted with an efficient, vacuum-sealed stirrer. The flask was heated and water removed. Terminal conditions were 98° C. and 15 mm. pressure. The residue in the flask was 1520 grams. The residue in the flask was a very thick, pale yellow syrup and was analyzed for hydroxyl content which was found to be 33%, showing that the product at this stage was 82.5% theory for pure AEH. The residue in the flask amounted to about 5.95 mols of AEH.

To the residue in the flask there were added 3360 grams (11.82 mols) of triphenyl phosphite and 17 grams of diphenyl phosphite as a catalyst. The mixture was heated slowly with stirring until a uniform dispersion of the syrup was obtained and the system was then evacuated to 15 mm. and the temperature increased slowly until distillation began. During a period of 3 hours, 1990 grams of distillate were removed and the maximum temperature reached was 145° C. The pressure was slowly reduced to 3 mm. to facilitate removal of the free phenol. The distillate had a set-point of 39.5° C., showing it was phenol of better than 99% purity. It amounted to 89.5% of the theoretical amount of 2 mols per mol of triphenyl phosphite required to produce the same dicyclic diphosphite called for in Example 16. The distillation residue was a thick syrup.

The amount of phenol removed showed that the product was predominantly the compound called for in Example 16 since the amount of phenol removed was approximately 3.6 mols per mol of AEH. If the compound prepared had only a single phosphorus ring, there would have been removed only 2 mols of phenol per mol of AEH syrup, and if the compound prepared had no phosphorus in the ring, then only one mol of phenol would have been removed for each mol of AEH.

The product of Example 21 was suitable for all the uses set forth previously, and in particular when used in an amount of 3 parts per 100 parts of polyvinyl chloride was a good heat stabilizer.

*Example 22*

The final product prepared in Example 21 was further distilled at 2 to 3 mm. and 370 grams of additional phenol were removed. The total phenol removed from the system was 2360 grams or 70.9% of the total amount of triphenyl phosphite charged. The still residue was a pale yellow, very viscous syrup at 100° C. and was a hard, brittle solid on cooling to 20° C. The specific gravity was 1.355 at 25° C. This is an exceptionally high specific gravity for an organic phosphite and indicates a very compact molecule. The phosphorus content was 13.0%. Theory for the product of Example 16 is 12.7%. This is further proof that the reaction went to produce the desired compound, namely, 2,14-diphenoxy-1,3,8,13,15-pentaoxa-2,14-diphospha - 11 - hydroxy[5,5,10,10]dispiro hexadecane. The product of Example 22 also had all the uses set forth previously and was an effective stabilizer for polyvinyl chloride when employed in an amount of 3 parts per 100 parts of polyvinyl chloride. Since it was a solid, it was added in finely divided form to the polyvinyl chloride. For best results in stabilizing polyvinyl chloride, there should also be added conventional additives such as barium-cadminum laurate and epoxidized soybean oil. Thus, a typical stabilizer formulation would include 3 parts of the compound of Example 22, 1.5 parts of barium-cadmium laurate and 2 parts of epoxidized soybean oil per 100 parts of polyvinyl chloride resin.

I claim:

1. An organic phosphite prepared by reacting one mol of 3,3,5,5-tetrakis(hydroxymethyl) - 4 - hydroxy tetrahydropyran with 2 mols of a phosphite having the formula $(RO)_3 P$ where R is alkyl, phenyl, alkyl phenyl, chlorophenyl or benzyl in the presence of 0.1 to 10% of a phosphite ester interchange catalyst and removing 3.6 to 4 mols of the phenol or alcohol as it is formed in the reaction by distillation.

2. A product according to claim 1 wherein R is phenyl.

3. A product according to claim 1 wherein R is alkyl.

4. A product according to claim 1 wherein R is alkyl phenyl.

5. A process of preparing a compound within claim 1 comprising reacting one mol of 3,3,5,5-tetrakis(hydroxymethyl)-4-hydroxy tetrahydropyran with 2 mols of triphenyl phosphite and removing 4 mols of phenol by distillation to produce a product having a phosphorus content of about 13%.

6. An organic phosphite prepared by reacting one mol of 3,3,5,5-tetrakis(hydroxymethyl) - 4 - hydroxy tetrahydropyran with one mol of a phosphite having the formula $(RO)_3P$ where R is alkyl, phenyl, alkyl, phenyl, halo phenyl or benzyl in the presence of 0.1 to 10% of a phosphite ester interchange catalyst and removing 2 mols of the phenol or alcohol as it is formed in the reaction by distillation.

7. A product according to claim 6 wherein R is phenyl.

8. A product according to claim 6 wherein R is alkyl.

References Cited
UNITED STATES PATENTS

| | | | |
|---|---|---|---|
| 2,537,726 | 1/1951 | Wittcoff et al. | 260—345.9 |
| 3,047,608 | 7/1962 | Friedman et al. | 260—461 |
| 3,074,966 | 1/1963 | Barnes | 260—345.9 |
| 3,082,189 | 3/1963 | Mack et al. | 260—45.95 |
| 3,142,651 | 7/1964 | Friedman | 260—2.5 |

WALTER A. MODANCE, *Primary Examiner.*

N. S. MILESTONE, *Assistant Examiner.*